United States Patent [19]

Guardiani

[11] Patent Number: 5,195,786
[45] Date of Patent: Mar. 23, 1993

[54] INTERNALLY-LOCATED DUAL FLOW ROTATING UNION

[75] Inventor: Richard F. Guardiani, Ohio Township, Allegheny County, Pa.

[73] Assignee: Westinghouse Electric Corp., Pittsburgh, Pa.

[21] Appl. No.: 649,506

[22] Filed: Feb. 1, 1991

[51] Int. Cl.$^5$ .................................. F16L 39/04
[52] U.S. Cl. ........................... 285/190; 285/275; 285/136
[58] Field of Search .......... 285/190, 14, 136, 41, 285/275, 310, 134, 276; 310/61, 113

[56] References Cited

U.S. PATENT DOCUMENTS

| | | | |
|---|---|---|---|
| 2,308,110 | 1/1943 | Schmeiser | 308/187.1 |
| 2,504,094 | 4/1950 | Turner et al. | 308/127 |
| 2,884,285 | 4/1959 | King, Jr. | 308/187.3 |
| 3,017,202 | 1/1962 | Swaney | 285/41 |
| 3,845,639 | 1/1974 | Smith, Jr. et al. | 62/505 |
| 3,990,731 | 11/1976 | Schnipke | 285/136 |
| 4,142,084 | 2/1979 | Torrani | 285/136 X |
| 4,192,559 | 3/1980 | Hewitt | 308/36.1 |
| 4,384,222 | 5/1983 | Zerlik | 310/61 |
| 4,502,738 | 3/1985 | Nauta | 384/477 |
| 4,728,840 | 3/1988 | Newhouse | 310/113 |
| 4,817,995 | 4/1989 | Deubler et al. | 285/14 |
| 4,887,907 | 12/1989 | Hahn et al. | 366/99 |
| 4,934,744 | 6/1990 | Samera, Jr. et al. | 285/190 X |
| 4,965,920 | 10/1990 | Smith | 285/190 X |
| 5,044,673 | 9/1991 | Jones, Jr. | 285/190 X |

Primary Examiner—Eric K. Nicholson

[57] ABSTRACT

A rotating union used to transmit fluid to and from a rotating shaft includes a hollow tubular housing having inlet and outlet ports defined on an outer end, a set of radial bearings stationarily mounting the tubular housing within an axial bore in the rotating shaft permitting rotation of the rotating shaft relative to the tubular housing and defining an annular fluid cavity flooding the bearings with fluid, and annular seal assemblies sealing the annular fluid cavity at the outer and inner ends of the tubular housing. The union also includes inner and outer hollow tubular pipes disposed in the tubular housing. The inner pipe at its inner end is supported for rotation with the rotating shaft by an annular plug located between infeed and return passages in the rotating shaft. The outer pipe is stationarily supported by the housing in flow communication with the inlet port but not with the outlet port and is disposed in flow communication with the inner pipe for transmitting fluid from the inlet port along the interiors of the outer and inner pipes to the infeed passage of the shaft and from the return passage of the shaft along the exteriors of the outer and inner pipes to the outlet port.

25 Claims, 2 Drawing Sheets

INTERNALLY-LOCATED DUAL FLOW ROTATING UNION

CROSS REFERENCE TO RELATED APPLICATION

Reference is hereby made to the following copending application dealing with related subject matter and assigned to the assignee of the present invention: "Internally-Located Rotating Union For A Motor-Generator Set" by Brian L. Newhouse, assigned U.S. patent Ser. No. 07/042,184 and filed Apr. 24, 1987, now U.S. Pat. No. 5,149,141.

BACKGROUND OF THE INVENTION

1. Field of the Invention

The present invention relates generally to rotating unions and, more particularly, is concerned with an internally-located dual flow rotating union for transmitting pressurized fluid into and out of an end of a rotating shaft.

1. Description of the Prior Art

It is conventional practice to transmit a fluid from a stationary source into and out of a shaft of a machine, such as a turbine generator and motor, as the machine is operating with the shaft rotating The shaft may require the fluid for cooling or for some other purpose A connection or joint, generally referred to as a rotating union, is used in the prior art for introducing fluid from the stationary source into the rotating shaft and discharging the fluid therefrom. Many different versions of both external and internal (in-the-shaft mounted) rotating unions are commercially available, such as ones manufactured and marketed by Deublin Company of Northbrook, Illinois.

Dual flow rotating unions are ones which introduce and discharge fluid into and from the same end of the rotating shaft. Present designs of externally mounted dual flow rotating unions and of dual flow rotating unions employing ball bearings have several drawbacks. Externally mounted dual flow rotating unions are susceptible to shaft induced shock loads which can damage the bearings and seals of the rotating union. Externally mounted rotating unions also require considerable length beyond the end of the shaft, significantly increasing the overall length of the rotating assembly.

Ball bearings used in rotating unions have a limited life which is highly dependent on both the radial load and the axial preload. Special assembly procedures must be used to ensure proper preload. Also, the bearings must be replaced on a periodic basis to preclude unscheduled equipment shutdown due to bearing failure. Ball bearings, even those designed for quiet operation, are inherently "noisy". Further, ball bearings used in rotating assemblies must be protected from the operating fluid which can introduce foreign material into the bearings and can cause corrosion of the bearing races and balls; either of these can cause premature failure of the bearings. Special bearing seals and/or sealing and purging schemes are used to protect the ball bearings.

Consequently, a need exists for a dual flow rotating union design which will avoid the above-mentioned drawbacks.

SUMMARY OF THE INVENTION

The present invention provides a dual flow rotating union designed to satisfy the aforementioned needs. The dual flow rotating union of the present invention has the following primary design features which overcome the shortcomings of the prior art and provide improved rotating union reliability and useful life. First, the rotating union is internally-located with inlet and outlet ports being the only major parts extending beyond the end of the rotating shaft. This eliminates the need for an external structure separate from the rotating shaft for supporting the rotating union. Second, the rotating union employs radial bearings which are located entirely within the shaft bore to eliminate direct application of shaft-induced shock loads on the bearings and seals, extending the life of these parts. Third, the radial bearings are either hydrodynamic or hydrostatic type which are flooded by the operating fluid for lubrication.

Accordingly, the present invention is directed to a rotating union for use in transmitting pressurized fluid from a stationary source into and out of a rotating shaft having an open axial bore and a pair of infeed and return passages axially spaced from one another and communicating with the axial bore. The rotating union includes: (a) an elongated hollow tubular housing having axially-displaced inner and outer ends and inlet and outlet ports defined on the outer end thereof; (b) bearing means for stationarily mounting the tubular housing within the bore in the rotating shaft to permit rotation of the rotating shaft relative to the tubular housing, the bearing means further mounting the tubular housing in spaced relation to the rotating shaft for defining an annular fluid cavity between the shaft end section and the exterior the tubular housing to permit flow of fluid between the outer and inner ends of the exterior of the tubular housing and flooding of the bearing means; (c) means for sealing the annular fluid pathway at the outer and inner ends of the tubular housing; (d) an inner hollow tubular pipe disposed in the hollow tubular housing and having axially-displaced inner and outer ends, the inner tubular pipe projecting from the inner end of the tubular housing into the axial bore of the rotating shaft; (f) means disposed in the axial bore of the rotating shaft between the infeed and return passages of the shaft for supporting the inner pipe at the inner end thereof for rotation with the rotating shaft; and (g) an outer tubular pipe disposed in the hollow tubular housing and having axially-displaced inner and outer ends. The supporting means permits flow communication between the infeed passage and the interior of the inner pipe and between the return passage and the exterior of the inner piper. The supporting means further prevents flow communication between the infeed and return passages through the axial bore of the rotating shaft. The outer pipe has a central channel and is rigidly connected in stationary relationship at its outer end with the outer end of the tubular housing and in flow communication with the inlet port but not with the outlet port thereof. The outer pipe is disposed in flow communication at its central channel with the central passage of the inner pipe for transmitting fluid from the inlet port at the outer end of the tubular housing to the infeed passage of the rotating shaft. The outer and inner pipes also are spaced radially inwardly from the interior of the tubular housing to define an annular chamber for transmitting fluid to the outlet port at the outer end of the tubular housing from the return passage of the rotating shaft.

These and other features and advantages of the present invention will become apparent to those skilled in the art upon a reading of the following detailed description when taken in conjunction with the drawings herein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
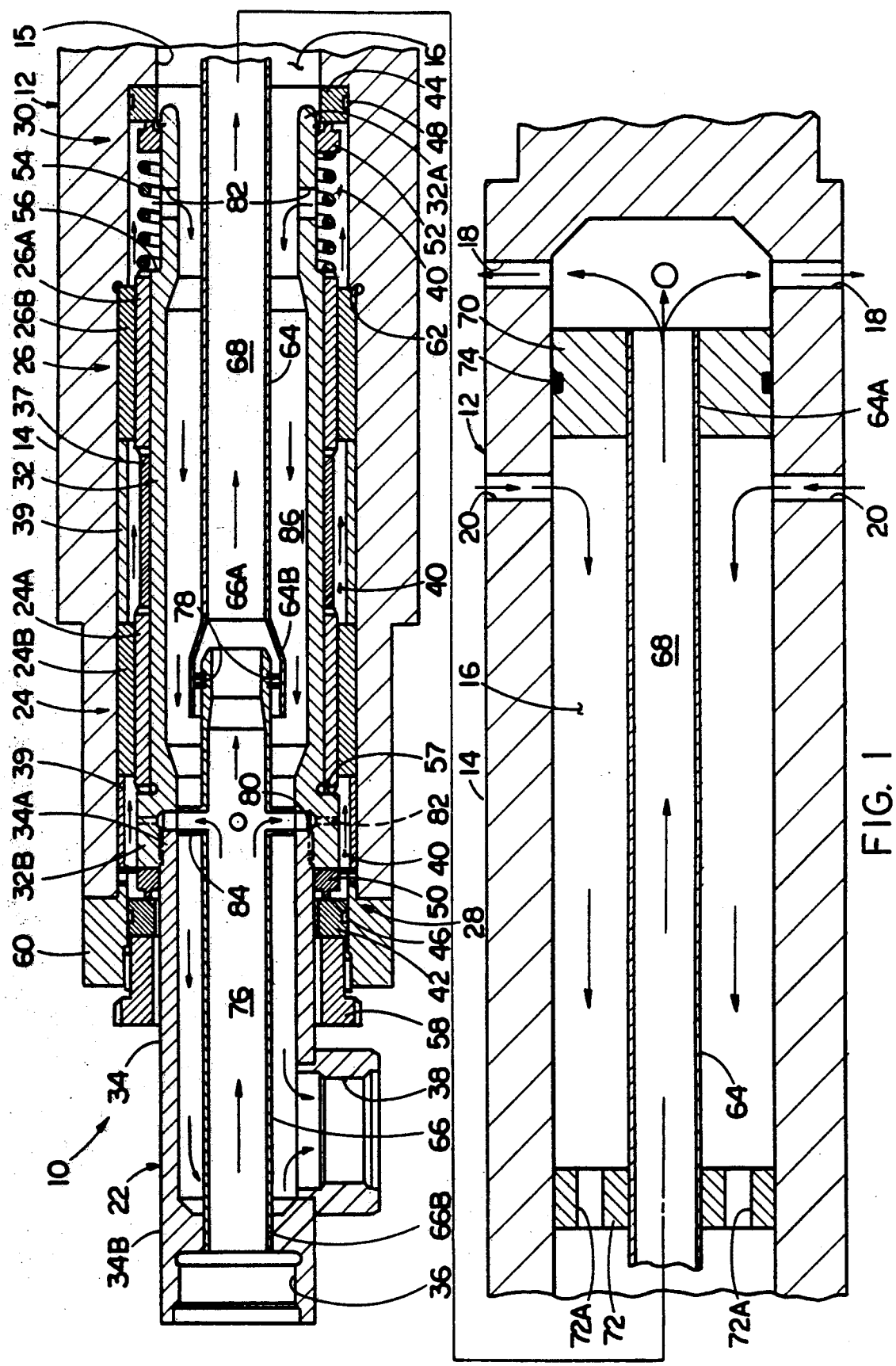
FIG. 1 is a longitudinal axial sectional view of a preferred embodiment of an internally-located dual flow rotating union of the present invention incorporated in an end axial bore of a rotating shaft employing hydrodynamic bearings.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIG. 1, there is shown a rotating union, generally designated 10, in accordance with the principles of the present invention. The rotating union 10 is designed specifically for use in transmitting pressurized fluid, for example a coolant such as water, from a stationary source (not shown) into and out of a rotating shaft 12, for instance, of a turbine/motor generator. The rotating shaft 12 has an annular-shaped end section 14 with an interior cylindrical wall 15 defining an open axial bore 16 and a plurality of infeed and return passages 18, 20 extending transversely to and communicating with the axial bore 16 and axially spaced from one another. The infeed and return passages 18, 20 are provided for routing the coolant water to and from coils (not shown) of the turbine/motor generator or any other such component requiring cooling.

Basically, the rotating union 10 includes an elongated hollow tubular housing 22, sets of outer and inner radial bearings 24, 26, and outer and inner annular seal assemblies 28, 30. The tubular housing 22 is composed of an inner housing portion 32 and an outer housing portion 34 having respective inner and outer ends 32A, 34A and 32B, 34B. The outer end 32B of the inner housing portion 32 is internally threaded and the inner end 34A of the outer housing portion 34 is externally threaded for threadably connecting the inner and outer housing portions 32, 34 to one another. The outer housing portion 34 defines inlet and outlet ports 36, 38 on its outer end 34B.

Figure 2:
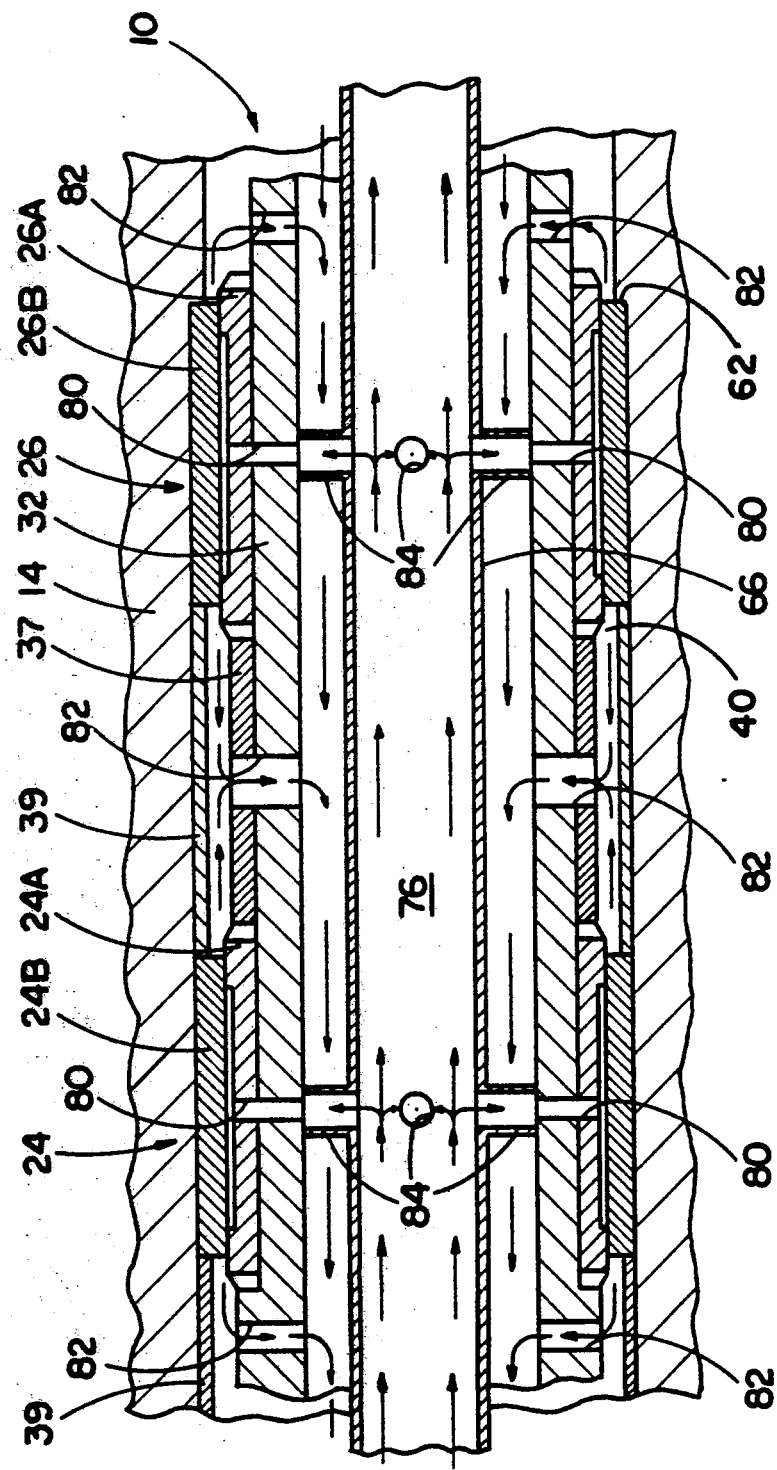
FIG. 2 is a fragmentary longitudinal axial sectional view of an alternative embodiment of the internal rotating union employing hydrostatic bearings.

The outer and inner radial bearings 24, 26 stationarily mount the inner housing portion 32 of the tubular housing 22 within the axial bore 16 of the rotating shaft 12 for permitting rotation of the rotating shaft 12 relative to the stationary tubular housing 22. The outer and inner radial bearings 24, 26 are composed of concentric inside and outside annular runners 24A, 24B and 26A, 26B. The inside runners 24A, 26A are separated by an annular inside spacer 37. The outside runners 24B, 26B are separated by annular outside spacers 39. The outer and inner radial bearings 24, 26 are either hydrodynamic types as seen in FIG. 1, or can be hydrostatic types as seen in FIG. 2. The choice of hydrodynamic or hydrostatic application will depend upon such factors as shaft operating speed(s), inlet and outlet differential pressure, and operating loads.

The inner housing portion 32 of the tubular housing 22 is spaced by the outer and inner radial bearings 24, 26 radially inwardly from the interior of the shaft end section 14 so as to define an annular fluid cavity 40. The presence of the annular fluid cavity 40 permits flow of fluid between the outer and inner ends 32B, 32A of the exterior of the inner housing portion 32 and flooding of the inside and outside runners 24A, 26B and 26A, 26B of the radial bearing 24, 26 for providing lubrication thereof. By way of example, the inside and outside runners can be composed of Stellite and Graphitar 14 materials.

The outer and inner annular seal assemblies 28, 30 are disposed in the axial bore 16 respectively at the outer and inner ends 32B, 32A of the inner housing portion 32 and the annular fluid cavity 40 defined between the inner housing portion 32 and the rotating shaft 12. The outer and inner sealing assemblies 28, 30 include respective outer and inner end seal rings 42, 44, outer and inner O-rings 46, 48 mounted about the outer and inner end seal rings 42, 44, and outer and inner annular face seals 50, 52 mounted adjacent to the respective outer and inner end seal rings 42, 44. Also a biasing element 54 in the form of a coil spring is mounted about the inner end 32A of the inner housing portion 32 between an annular shoulder 56 thereon and the inner annular face seal 52. The biasing spring 54 maintains the outer and inner annular face seals 50, 52 seated against the respective outer and inner end seal rings 42, 44 to prevent significant quantities of fluid from leaking out of the rotating union 10 at the outer sealing assembly 28.

In the preferred embodiment, the inside runners 24A, 26A are shrunk fit onto the inner housing 32, however, they may be pinned to the housing. Further, the spacer 37 may or may not be shrunk onto the inner housing 32. Still further, the inside runner 24A abuts against an annular shoulder 57 on the outer end 32B of the inner housing portion 32 when the runner is so shrunked or pinned.

In actuality, both face seals 50, 52 rely on a small amount of leakage of fluid to ensure proper functioning of the sealing assemblies 28, 30. Any leakage at the inner sealing assembly 30 is of no concern. At the outer sealing assembly 28, any leakage is expected to be in the form of steam. However, a collection assembly (not shown) can be installed on the outer housing portion 34 to collect the leakoff from the outer sealing assembly 28 in the event some of the leakage is in liquid form, such as steam condensate.

Because the outer and inner end face seals 50, 52 are the only parts expected to undergo significant wear over an extended period of time, they can be removed by removal of the tubular housing 22 after removal of an axial preload member in the form of an annular nut 58 threaded on an annular retainer 60 attached to the outer end of the rotating shaft 12. The preload nut 58 engages the outer seal assembly 28 and compresses the biasing spring 54 against the inner seal assembly 30. By rotation of the preload nut 58, the initial preload pressure on the outer and inner end face seals 50, 52 of the outer and inner seal assemblies 28, 30 can be adjusted to ensure that a clearance does not occur when the pressure of the fluid flowing into the rotating shaft 12 through the rotating union 10 is reduced to ambient.

This adjustment can be made without disassembling the rotating union 10.

It should be noted here that the outside runners 24B, 26B of the outer and inner radial bearings 24, 26 and the outside spacers 39 are shown installed between an internal annular shoulder 62 in the rotating shaft 12 and the annular retainer 60 and thus before the annular retainer 60 is attached to the rotating shaft. The radial bearings outside runners 24B, 26B may be attached directly to the rotating shaft 12 as shown, or may be part of a housing which fits inside the shaft and is attached to the end of the shaft by bolting or some other means. Attaching the bearings directly to the inside of the shaft has the advantage of maximizing the inlet and outlet flow areas and minimizing the pressure drop across the rotating union 10.

The rotating union 10 also includes inner and outer hollow tubular siphon pipes 64, 66 disposed in the tubular housing 22. The inner hollow pipe 64 has an open central passage 68 extending between its opposite inner and outer ends 64A, 64B. The inner pipe 64 is supported for rotation with the rotating shaft 12 by an annular plug 70 located between the infeed and return passages 18, 20 in the rotating shaft 12 and an annular collar 72 disposed within the axial bore 16 between the inner end 32A of the inner housing portion 32 and the annular plug 70. The annular plug 70 includes an external 0-ring 74 for providing a seal between the infeed and return passages 18, 20 along the exterior of the inner pipe 64. Axial passages 72A are provided in the collar 72 for permitting passage of fluid therethrough.

The outer hollow pipe 66 has an open central channel 76 extending between its opposite inner and outer ends 66A, 66B. The outer pipe 66 is stationarily supported at its outer end 66B by a rigid connection to the outer end 34B of the outer housing portion 34. Only the interior, or central channel 76, of the cuter pipe 66 is provided in flow communication with the inlet port 36, whereas only the exterior of the outer pipe 66 is provided in flow communication with the outlet port 38. The outer pipe 66 at its inner end 66A interfits or mates within a flared outer end 64B of the inner pipe 64. Floating ring seals 78 are provided between the inner end 66A of the outer pipe 66 and the outer end 64B of the inner pipe 64. The floating ring seals 78 are hydrodynamically lubricated and not only provide long life, low leakage seals but also accommodate significant misalignment between the inner and outer siphon pipes 64, 66. Thus, fluid flow communication is provided between the interior, or central channel 76, of the outer pipe 66 and the interior, or central passage 68, of the inner pipe 64 for transmitting fluid from the inlet port 36 along the interiors of the outer and inner pipes 66, 64 to the infeed passage 18 of the rotating shaft 12 and from the return passage 20 of the rotating shaft 12 along the exteriors of the outer and inner pipes 66, 64 to the outlet port 38.

The outer and inner housing portions 34, 32 have respective rows of circumferentially spaced holes 80, 82 which communicate with the annular fluid cavity 40. The holes 82 in the inner housing portion 32 communicate the annular fluid cavity 40 with the exteriors of the inner and outer pipes 64, 66 and thus ultimately with the outlet port 38. The holes 80 in the outer housing portion 84 communicate the annular fluid cavity 40 with the interior of the outer pipe 66 via short tubular nipples 84 on the outer pipe 66. Thus, incoming fluid can not only flow in the direction of the arrows through the interiors of the outer and inner pipes 66, 64 to the infeed passages 18, as seen in FIG. 1, but also flows via the nipples 84 and holes 80, 82 through the annular fluid cavity 40 before merging back with the fluid flow in the direction of the arrows from the return passages 20 through an annular chamber 86, being defined between the exterior of the inner and outer pipes 64, 66 and interior of the tubular housing 22, to the outlet port 38.

With such arrangement, the radial bearings 24, 26 are supplied with operating fluid from the high pressure inlet side and discharge fluid to the low pressure outlet side of the rotating union 10. The fluid flow rate through the bearings 24, 26 is controlled by holes 80 and 82. This arrangement not only assures the proper flow to maintain flooding of the bearings, but also provides for self-venting of the bearings to ensure no air pockets are retained after flow through the rotating union 10 is initiated.

It should be noted also that the two part assembly of the tubular housing 22 by outer and inner housing portions 34, 32 and of the inner and outer siphon pipe 64, 66 permits disassembly of the rotating union 10 for replacement of the inner and outer seal assemblies 30, 28. This construction of the rotating union 10 is particularly useful where the application requires minimum volume, minimum noise, minimum leakage, maximum shock resistance capability, and maximum reliability of the rotating union 10.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A rotating union for use in transmitting pressurized fluid form a stationary source into and out of a rotating shaft having an interior wall defining an open axial bore and a pair of infeed and return passages axially spaced from one another and communicating with the axial bore, said rotating union comprising:
    (a) an elongated stationary hollow tubular housing having axially-displaced inner and outer ends and inlet and outlet ports defined on said outer end thereof, said tubular housing including
        (i) an inner hollow housing portion disposable within the axial bore in the shaft end section and having axially-spaced inner and outer ends; and
        (ii) an outer hollow housing portion at least partially disposable within the axial bore in the shaft end section and having axially-spaced inner and outer ends, said outer housing portion at said inner end being detachably connected to said inner housing portion at said outer end, said outer housing portion having said inlet and outlet ports defined on said outer end thereof;
    (b) bearing means for mounting said stationary tubular housing within the axial bore in the shaft end section to permit rotation of the rotating shaft relative to said stationary housing, said bearing means further mounting said tubular housing in spaced relation to the interior wall of the shaft end section for defining an annular fluid cavity between the interior wall of shaft end section and the exterior of said tubular housing to permit flow of fluid between said outer and inner ends of said tubular housing at the exterior thereof and within said bearing means;

(c) means for sealing said annular fluid cavity at said outer and inner ends of said tubular housing;

(d) an inner hollow tubular pipe disposed in said hollow tubular housing and having axially-displaced inner and outer ends and a central passage extending therebetween, said inner tubular pipe projecting from said inner end of said tubular housing into the axial bore of the shaft end section;

(e) means disposed in the axial bore of the shaft end section between the infeed and return passages of the shaft end section for supporting said inner pipe at said inner end thereof for rotation with the rotating shaft, said supporting means also for permitting flow communication between the infeed passage and the interior of said inner pipe and between the return passage and the exterior of said inner pipe, said supporting further for preventing flow communication between the infeed and return passages through the axial bore of the shaft end section; and (f) an outer tubular pipe disposed in said hollow tubular housing and having axially-displaced inner and outer ends, said outer pipe having a central channel defined therethrough and being rigidly connected in stationary relationship at its outer end with said outer end of said tubular housing and in flow communication with said inlet port but not with said outlet port thereof, said outer pipe being disposed in flow communication at its central channel with said central passage of said inner pipe for transmitting fluid from said inlet port at said outer end of said tubular housing to the infeed passage of the rotating shaft, said outer and inner pipes being spaced radially inwardly form the interior of said tubular housing to define an annular channel for transmitting fluid to said outlet port at said outer end of said tubular housing from the return passage of the rotating shaft.

2. The rotating union as recited in claim 1 wherein said bearing means includes radial bearings stationarily mounting the inner housing portion within the axial bore of the rotating shaft for permitting rotation of the rotating shaft relative to the stationary tubular housing.

3. The rotating union as recited in claim 2, wherein radial bearings include concentric inside and outside annular runners.

4. The rotating union as recited in claim 3, wherein said bearing runners are hydrodynamic types.

5. The rotating union as recited in claim 3, wherein said bearing runners are hydrostatic types.

6. The rotating union as recited in claim 1, wherein said sealing means includes outer and inner annular seal assemblies disposed in the axial bore respectively at said outer and inner ends of said inner housing portion and defining opposite ends of said annular fluid cavity between said inner housing portion and the rotating shaft.

7. The rotating union as recited in claim 6, wherein said outer and inner sealing assemblies respectively include:

outer and inner end seal rings; and outer and inner annular face seals mounted adjacent and in engagement with said respective outer and inner end seal rings.

8. The rotating union as recited in claim 7, wherein said sealing means also includes a biasing spring element mounted about said inner end of said inner housing portion and operable for maintaining said outer and inner annular face seals seated against said respective outer and inner end seal rings.

9. The rotating union as recited in claim 8, wherein said sealing means also includes a preload element adjustably fastened on the shaft end section and engaging said outer seal assembly for compressing said biasing spring element against said inner seal assembly, said preload element being rotatable for adjusting the preload pressure on said outer and inner end face seals.

10. The rotating union as recited in claim 1, wherein said supporting means includes:

an annular plug fitted about said inner end of said inner tubular pipe; and an annular collar fitted about said inner pipe and located between said inner end of said tubular housing and said annular plug.

11. The rotating union as recited in claim 1, further comprising:

at least one floating ring seal provided between said inner end of said outer pipe and said outer end of said inner pipe.

12. The rotating union as recited in claim 1, wherein said outer and inner housing portions have holes in flow communication with said annular fluid cavity, said holes in said inner housing portion providing flow communication of said annular fluid cavity with the exterior of said inner and outer pipes.

13. The rotating union as recited in claim 12, wherein said outer pipe has radially extending hollow elements disposed in flow communication said holes in said outer housing portion for providing flow communication between said annular fluid cavity and the interior of said outer pipe.

14. In combination with a rotating shaft including an annular-shaped end section having an interior wall defining an open axial bore and a pair of infeed and return passages axially spaced from one another and communicating with said axial bore, a rotating union for transmitting pressurized fluid from a stationary source into and out of said respective infeed and return passages of said rotating shaft, said rotating union comprising:

(a) an inner tubular housing portion disposed within said axial bore in said shaft end section and having a hollow interior and axially-displaced inner and outer ends;

(b) bearing means for stationarily mounting said inner housing portion within said axial bore in said shaft end section to permit rotation of said rotating shaft relative to said stationary inner housing portion, said bearing means further mounting said inner housing portion in spaced relation to said rotating shaft for defining an annular fluid cavity between said shaft end section and the exterior of said inner housing portion for permitting flow of fluid between said outer and inner ends of the exterior of said inner housing portion to provide lubrication of said bearing means by the fluid, said bearing means including radial bearings stationarily mounting said inner housing portion within said axial bore of said rotating shaft for permitting rotation of said rotating shaft relative to said stationary outer and inner tubular housing portions;

(c) sealing means disposed at said outer and inner ends of said inner housing portion between the exterior thereof and said shaft end section for sealing opposite ends of said annular fluid cavity at said outer and inner ends of said inner housing portion;

(d) an outer tubular housing portion at least partially disposed within said axial bore in said shaft end section and having a hollow interior and axially-displaced inner and outer ends, said outer housing portion having an inlet port and an outlet port defined on said outer end thereof, said outer housing portion at said inner end thereof being releasably rigidly connected to said inner housing portion at said outer end thereof;

(e) an inner tubular pipe disposed in said hollow interior of said inner housing portion and having axially-displaced inner and outer ends;

(f) means disposed in said axial bore of said shaft end section between said infeed and return passages of said shaft end section for supporting said inner pipe for rotation with rotation of said rotating shaft, said supporting means also for permitting flow communication between said infeed passage and the interior of said inner pipe and between said infeed passage and the exterior of said inner pipe, said supporting means further for preventing flow communication between said infeed and return passages through said axial bore of said shaft end section; and (g) an outer tubular pipe disposed in said hollow interior of said outer housing portion and having axially-displaced inner and outer ends, said outer pipe having a central channel defined therethrough and being rigidly connected at its outer end to said outer end of said outer housing portion in flow communication with said inlet port but not with said outlet port thereof, said outer pipe at its inner end being interfitted with said outer end of said inner pipe and disposed in flow communication at its central channel with said central passage of said inner pipe for transmitting fluid from said inlet port at said outer end of said outer housing portion to said infeed passage of said rotating shaft, said outer and inner pipes being spaced radially inwardly from the interior of said outer and inner housing portions to define an annular channel for transmitting fluid to said outlet port at said outer end of said outer housing portion from said return passage of said rotating shaft.

15. The rotating union as recited in claim 14, wherein radial bearings include concentric inside and outside annular runners.

16. The rotating union as recited in claim 15, wherein said bearing runners are hydrodynamic types.

17. The rotating union as recited in claim 15, wherein said bearing runners are hydrostatic types.

18. The rotating union as recited in claim 14, wherein said sealing means includes outer and inner annular seal assemblies disposed in said axial bore respectively at said outer and inner ends of said inner housing portion and defining opposite ends of said annular fluid cavity between said inner housing portion and said rotating shaft.

19. The rotating union as recited in claim 18, wherein said outer and inner sealing assemblies respectively include:
   outer and inner end seal rings; and
   outer and inner annular face seals mounted adjacent and in engagement with said respective outer and inner end seal rings.

20. The rotating union as recited in claim 19, wherein said sealing means also includes a biasing spring element mounted about said inner end of said inner housing portion and operable for maintaining said outer and inner annular face seals seated against said respective outer and inner end seal rings.

21. The rotating union as recited in claim 20, wherein said sealing means also includes a preload element adjustably fastened on said shaft end section and engaging said outer seal assembly for compressing said biasing spring element against said inner seal assembly, said preload element being rotatable for adjusting the preload pressure on said outer and inner end face seals.

22. The rotating union as recited in claim 14, wherein said supporting means includes:
   an annular plug fitted about said inner end of said inner tubular pipe; and
   an annular collar fitted about said inner pipe and located between said inner end of said tubular housing and said annular plug.

23. The rotating union as recited in claim 14, further comprising:
   at least one floating ring seal provided between said inner end of said outer pipe and said outer end of said inner pipe.

24. The rotating union as recited in claim 14, wherein said outer and inner housing portions have holes in flow communication with said annular fluid cavity, said holes in said inner housing portion providing flow communication of said annular fluid cavity with the exterior of said inner and outer pipes.

25. The rotating union as recited in claim 24, wherein said outer pipe has radially extending hollow elements disposed in flow communication said holes in said outer housing portion for providing flow communication between said annular fluid cavity and the interior of said outer pipe.

* * * * *